US008548451B2

(12) United States Patent
Yamashita et al.

(10) Patent No.: US 8,548,451 B2
(45) Date of Patent: Oct. 1, 2013

(54) INFORMATION PROCESSING SYSTEM, APPARATUS, AND METHOD

(75) Inventors: Koichiro Yamashita, Kawasaki (JP); Hiromasa Yamauchi, Kawasaki (JP); Takahisa Suzuki, Kawasaki (JP); Koji Kurihara, Kawasaki (JP); Kiyoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/251,388

(22) Filed: Oct. 3, 2011

(65) Prior Publication Data

US 2012/0088485 A1    Apr. 12, 2012

(30) Foreign Application Priority Data

Oct. 6, 2010    (JP) .................. 2010-226939

(51) Int. Cl.
*H04W 4/02*    (2009.01)
(52) U.S. Cl.
USPC ....................... 455/418; 455/456.1
(58) Field of Classification Search
USPC .............. 455/418–420, 456.1–456.6
See application file for complete search history.

(56) References Cited

U.S. PATENT DOCUMENTS

| | | | | |
|---|---|---|---|---|
| 2009/0098888 | A1* | 4/2009 | Yoon | 455/456.2 |
| 2010/0071018 | A1* | 3/2010 | Kabuto | 725/127 |
| 2010/0317368 | A1* | 12/2010 | Augst et al. | 455/456.1 |
| 2011/0045816 | A1* | 2/2011 | Wang et al. | 455/420 |
| 2011/0237200 | A1* | 9/2011 | Reunamki et al. | 455/67.11 |
| 2011/0289454 | A1* | 11/2011 | Houllier et al. | 715/810 |
| 2012/0003991 | A1* | 1/2012 | Loveland | 455/456.1 |
| 2012/0052870 | A1* | 3/2012 | Habicher | 455/456.1 |
| 2012/0077521 | A1* | 3/2012 | Boldyrev et al. | 455/456.3 |

FOREIGN PATENT DOCUMENTS

| | | |
|---|---|---|
| EP | 2077654 A1 | 7/2009 |
| EP | 2077654 A1 * | 7/2009 |
| JP | 11-288394 A | 10/1999 |
| JP | 2007-219961 A | 8/2007 |
| WO | WO-2007-121414 A2 | 10/2007 |

OTHER PUBLICATIONS

Extend European Search Report dated Mar. 12, 2012 for corresponding European Application No. 11183604.5.
Deitel, Harvey M., "An Introduction to Operating Systems," Real Storage, Addison-Wesley Publishing Company, ISBN: 0-201-14502-2, 1984, pp. 153-157, XP002671222.

* cited by examiner

*Primary Examiner* — Kamran Afshar
*Assistant Examiner* — Khawar Iqbal
(74) *Attorney, Agent, or Firm* — Fujitsu Patent Center

(57) ABSTRACT

An information processing system includes a first apparatus including a position information transmission unit to transmit information on the position of the first apparatus; and a second apparatus including, a position information acquisition unit to acquire a position of the second apparatus; a position information receiving unit to receive the information on the position of the first apparatus; a relative-position information acquisition unit to acquire relative-position information of the second and the first apparatus on the basis of the information on the position of the second and the first apparatus; and a control unit to control a coupling mode of the second and the first apparatus on the basis of the relative-position information.

12 Claims, 21 Drawing Sheets

INFORMATION PROCESSING SYSTEM, APPARATUS, AND METHOD

CROSS-REFERENCE TO RELATED APPLICATIONS

This application is based upon and claims the benefit of priority from the prior Japanese Patent Application No. 2010-226939 filed on Oct. 6, 2010, the entire contents of which are incorporated herein by reference.

FIELD

The embodiment discussed herein relates to an information processing system, an information processing apparatus, and an information processing method.

BACKGROUND

To date, systems that allow information processing apparatuses to directly transfer files, such as audio data, image data, etc., between the processing apparatuses have been provided. These systems use short-distance wireless communication techniques, such as infrared communication, Bluetooth (a registered trademark), etc. In such a system, for example, cellular phones sometimes exchange photo data or email-address data with each other. Also, systems that allow information processing apparatuses located at distant places to exchange data with each other through a server connected to a network have been provided. In such a system, for example, users of information processing apparatuses, at remote locations, that are connected to a network sometimes play a same game with each other at the same time, chat with each other, or use an social networking service (SNS), etc.

Incidentally, for example, as disclosed in Japanese Unexamined Patent Application Publication No. 11-288394, there has been a system that sorts and manages character information operated by each client on a server in accordance with a communication distance between the client and the server, and restricts clients to be allowed to exchange messages in accordance with communication distances between the clients. Also, systems that allow individual personal computers wirelessly communicating with each other to share resources have been provided. As one of such systems, for example, as disclosed in Japanese Laid-open Patent Publication No. 2007-219961, a system is provided in which shared-screen information allowing access from another personal computer among display screens of the own personal computer is transmitted to the other personal computer, and a shared screen of the other personal computer is displayed in the other-screen display area changing its area size in accordance with a mutual distance.

However, in related-art systems, it is not possible for information processing apparatuses to share resources, such as memories, file systems, etc. Also, it is for information processing apparatuses at remote locations to exchange data with each other through a server, and thus it is not possible for information processing apparatuses to exchange data using only a network without going through a server.

SUMMARY

According to an aspect of the embodiment, an information processing system includes a first apparatus including a position information transmission unit to transmit information on the position of the first apparatus; and a second apparatus including, a position information acquisition unit to acquire a position of the second apparatus; a position information receiving unit to receive the information on the position of the first apparatus; a relative-position information acquisition unit to acquire relative-position information of the second and the first apparatus on the basis of the information on the position of the second and the first apparatus; and a control unit to control a coupling mode of the second and the first apparatus on the basis of the relative-position information.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
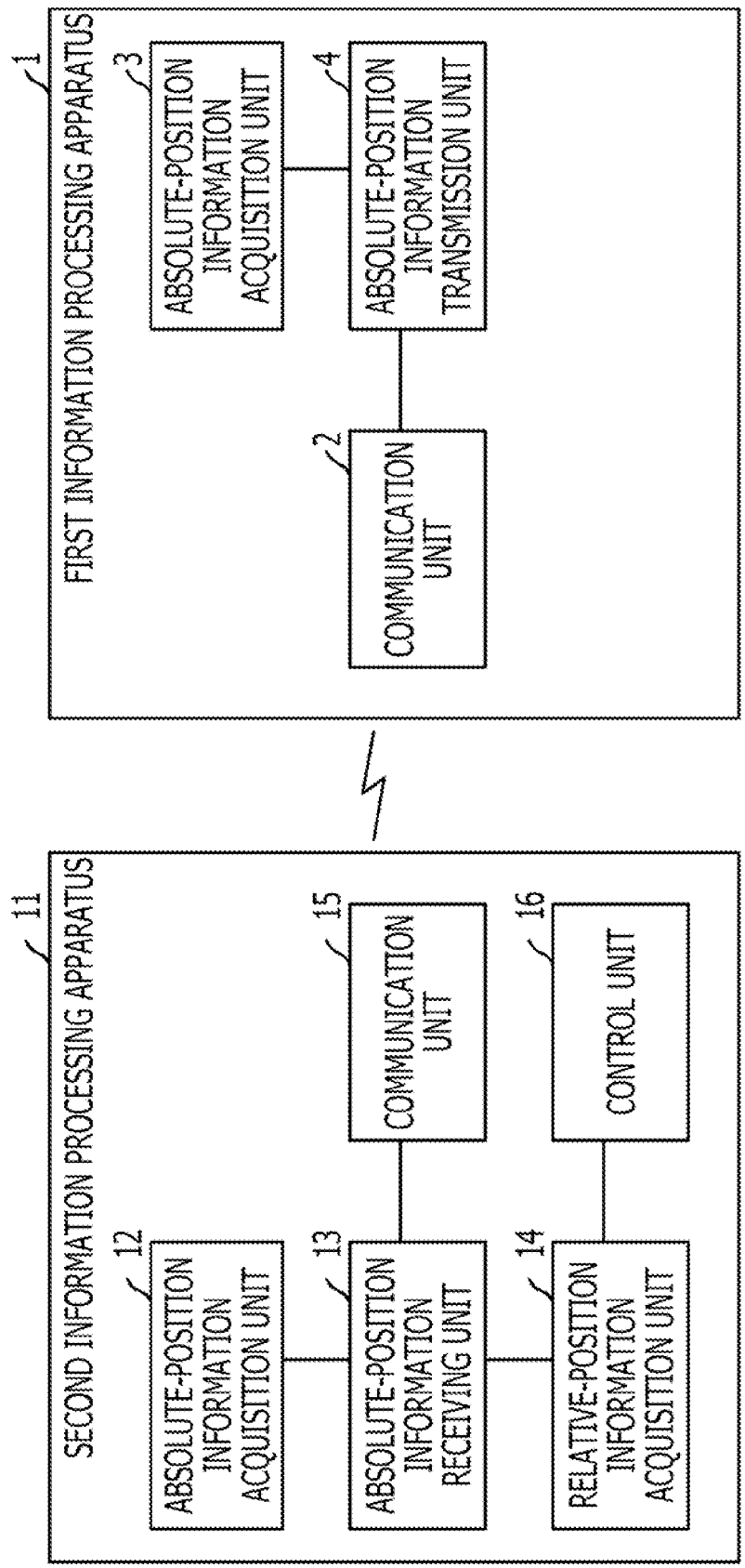
FIG. 1 is a block diagram illustrating an information processing system according to a first embodiment.

In the following, detailed descriptions will be given of preferred embodiments of the information processing system, the information processing apparatus, and the information processing method with reference to the accompanying drawings. In the information processing system, the information processing apparatus, and the information processing method, on the basis of relative position information of the information processing apparatuses with each other, a plurality of the information processing apparatuses are coupled in a form allowing an apparatus to access a storage of the other apparatus, or in a form allowing an apparatus to access a storage and a memory of the other apparatus, so that the information processing apparatuses share resources with each other. In the following description of each embodiment, a same reference numeral is given to a same component, and a duplicated description will be omitted.

First Embodiment

Description of Information Processing System

FIG. 1 is a block diagram illustrating the information processing system according to the first embodiment. As illustrated in FIG. 1, the information processing system includes a first information processing apparatus 1 and a second information processing apparatus 11. The first information processing apparatus 1 has a communication unit 2, an absolute-position information acquisition unit 3, and an absolute-position information transmission unit 4. The communication unit 2 communicates with another information processing apparatus. The absolute-position information acquisition unit 3 obtains a position of the first information processing apparatus 1. The absolute-position information transmission unit 4 transmits the position of the first information processing apparatus 1 through the communication unit 2.

The second information processing apparatus 11 has an absolute-position information acquisition unit 12, an absolute-position information receiving unit 13, a relative-position information acquisition unit 14, a communication unit 15, and a control unit 16. The communication unit 15 communicates with another information processing apparatus. The absolute-position information acquisition unit 12 obtains an absolute-position (i.e., position) of the second information processing apparatus 11. As used herein, "an absolute-position" or "position" refers to a position on the earth represented by a coordinate system. The absolute-position information receiving unit 13 receives the position of the first information processing apparatus 1 through the communication unit 15. The relative-position information acquisition unit 14 obtains relative-position information between the second information processing apparatus 11 and the first information processing apparatus 1 on the basis of information on the position of the second information processing apparatus 11 and the position of the first information processing apparatus 1. As used herein, a "relative-position" refers to a position which is relative position between the position of the first information processing apparatus on the earth represented by the coordinate system and the position of the second information processing apparatus on the earth represented by the coordinate system.

The control unit 16 controls a coupling mode of the second information processing apparatus 11 and the first information processing apparatus 1 on the basis of the relative-position information so that the mode becomes a first mode or a second mode. In the first mode, application programs being executed on the first information processing apparatus 1 and the second information processing apparatus 11 are allowed to access a storage of the other apparatus. For example, in the first mode, the first information processing apparatus 1 may access a storage of the second information processing apparatus 11, and the second information processing apparatus 11 may access a storage of the first information processing apparatus 1. That is to say, in the first mode, it is possible for the first information processing apparatus 1 and the second information processing apparatus 11 to use the storage of the other apparatus as shared resources. In the second mode, it is possible for application programs running on the first information processing apparatus 1 and the second information processing apparatus 11 to access a storage and a memory of the other apparatus. That is to say, in the second mode, it is possible for the first information processing apparatus 1 and the second information processing apparatus 11 to use the storage and the memory of the other apparatus as shared resources.

In the second mode, a frequency of synchronization of the information processing apparatuses with each other is high. For example, the information processing apparatuses frequently communicate with each other in units of granularity of function processing or less (tens of milliseconds or less). In the second mode, data input/output processing on a memory of the other information processing apparatus is performed at a higher speed than a communication speed. Accordingly, a speed of data input/output processing on the memory of the other information processing apparatus depends on a communication speed. The second mode is called a tightly-coupled mode, and when information processing apparatuses are coupled with each other in the tightly-coupled mode, the system is called a tightly coupled system.

In the first mode, a frequency of synchronization of the information processing apparatuses with each other is lower than that in the tightly-coupled mode. For example, the information processing apparatuses communicate with each other in units of a granularity of function processing or larger (tens of milliseconds or greater). In process of executing an application program, the information processing apparatuses share data in synchronism with each other before and after processing. In the second mode, access to a resource having a substantially same access speed as a communication speed, for example, access to a file system is performed in real time. The first mode is called a loosely-coupled mode, and when information processing apparatuses are coupled with each other in the loosely-coupled mode, the system is called a loosely coupled system.

Description of Operation of Information Processing System

Figure 2:
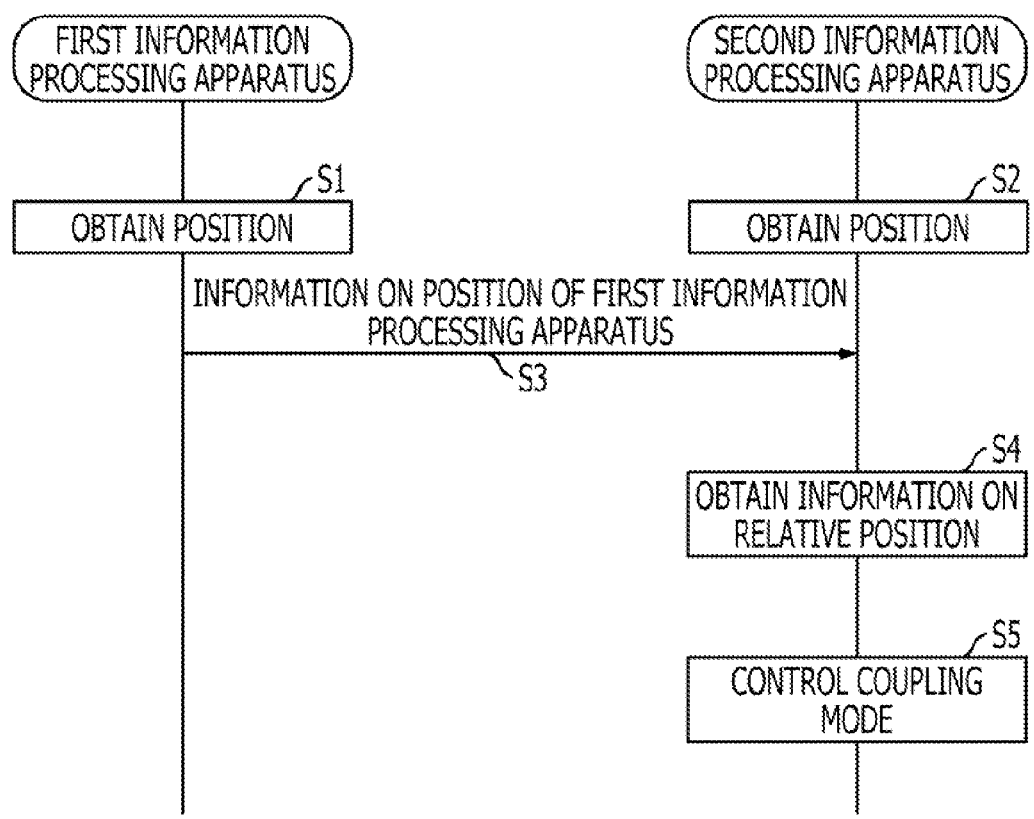
FIG. 2 is a sequence chart illustrating operation of the information processing system according to the first embodiment.

FIG. 2 is a sequence chart illustrating operation of the information processing system according to the first embodiment. As illustrated in FIG. 2, the first information processing apparatus 1 obtains a position of itself (step S1). Also, the second information processing apparatus 11 obtains a position of itself (step S2). Either step S1 or step S2 may be performed in advance or both steps may be performed at the same time. Next, the first information processing apparatus 1 transmits information on the position of itself obtained in step S1 to the second information processing apparatus 11. The second information processing apparatus 11 receives the information on the position of the first information processing apparatus 1 transmitted from the first information processing apparatus 1 (step S3). Either step S2 or step S3 may be performed in advance.

And the second information processing apparatus 11 obtains relative position information of itself and the first information processing apparatus 1 on the basis of the information on the position of the second information apparatus obtained in step S2 and the information on the position of the first information processing apparatus 1 in step S3 (step S4). Next, the second information processing apparatus 11 controls a coupling mode of itself and the first information processing apparatus 1 so as to go into the above-described loosely-coupled mode or tightly-coupled mode on the basis of the relative-position information obtained in step S4 (step S5).

By the first embodiment, on the basis of the relative position between the information processing apparatuses with each other, a coupling mode of the information processing apparatuses is controlled so as to be a mode allowing access to a storage of the other apparatus or a mode allowing access to a storage and a memory of the other apparatus, and thus the information processing apparatuses are allowed to share resources, such as a storage, a memory, etc. Also, the information processing apparatuses are allowed to access a storage and a memory of the other apparatus, and thus the information processing apparatuses are allowed to exchange data using only a network without going through a server.

Second Embodiment

A second embodiment is a case where the information processing apparatus is applied to a terminal, such as a cellular phone, etc.

Figure 3:
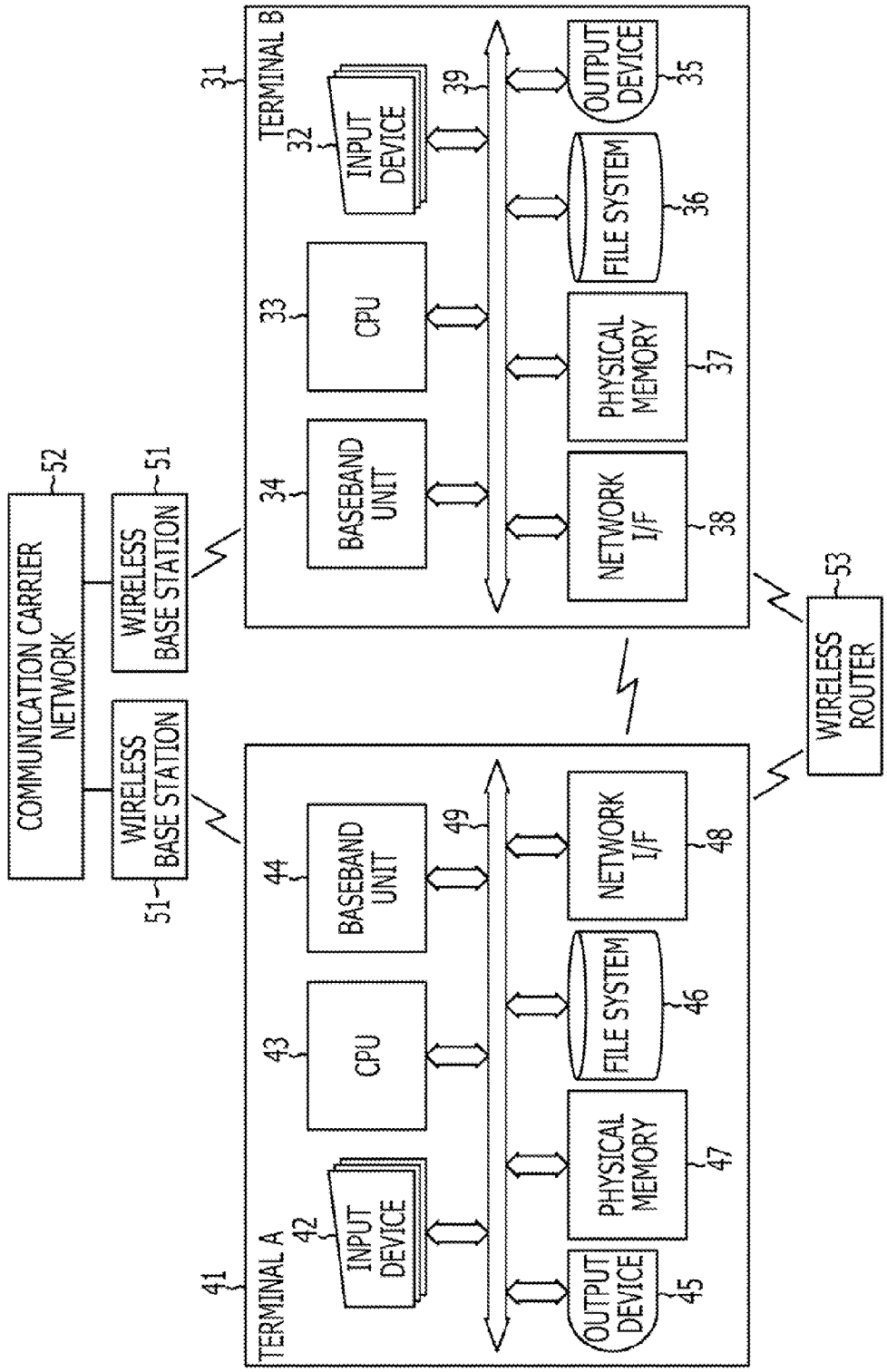
FIG. 3 is a block diagram illustrating an information processing system according to a second embodiment.

Description of Hardware Configurations of Information Processing System and Information Processing Apparatus FIG. 3 is a block diagram illustrating the information processing system according to the second embodiment. As illustrated in FIG. 3, the information processing system includes, for example, a terminal B31 as a first information processing apparatus, and, for example, a terminal A41 as a second information processing apparatus. Also, the information processing system includes, for example, a communication carrier network 52 as a network to which wireless base stations 51 are connected, and a wireless router 53 of WiFi (Wireless Fidelity), etc.

The terminal A41 has a configuration in which an input device 42, a CPU (Central Processing Unit) 43, a baseband unit 44, an output device 45, a file system 46, a physical memory 47, and a network interface (network I/F) 48 are mutually connected through a bus 49. The terminal B31 has a configuration in which an input device 32, a CPU 33, a baseband unit 34, an output device 35, a file system 36, a physical memory 37, and a network I/F 38 are mutually connected through a bus 39.

The input devices 32 and 42 include a sensor device capable of obtaining position information, such as an acceleration sensor, a GPS (Global Positioning System) receiver, an electronic compass, etc., for example. The input devices 32 and 42 include devices used when a user inputs characters and data, for example, such as a keyboard, a button, a dial, a touch panel, etc., and an audio-input device, for example, a microphone, etc.

The CPUs 33 and 43 execute an operating system (OS) and an application program to perform overall control of the terminals 31 and 41. The CPUs 33 and 43 perform logical/logical conversion which converts a logical address space referenced by an application program capable of performing parallel processing that is operated across the terminal B31 and the terminal A41 into a logical address space managed by the OSs of the individual terminals, for example, in a built-in memory management unit. The CPUs 33 and 43 perform logical/physical conversion which converts a logical address space managed by the OS of an individual terminal into a physical address space, for example, in a built-in memory management unit.

The file systems 36 and 46 store the OS and the application program. The physical memories 37 and 47 are used for work areas of the CPUs 33 and 43. The output devices 35 and 45 include a display device, such as for example, a liquid crystal panel, etc., an audio output device, such as a speaker, etc., for example, and a printing device, such as a printer, etc., for example. The baseband units 34 and 44 perform communication with the communication carrier network 52 through the wireless base stations 51. The network I/Fs 38 and 48 perform mutual communication through a wireless router 53 or directly by an ad-hoc connection.

Description of Functional Configuration of Information Processing Apparatus

Figure 4:
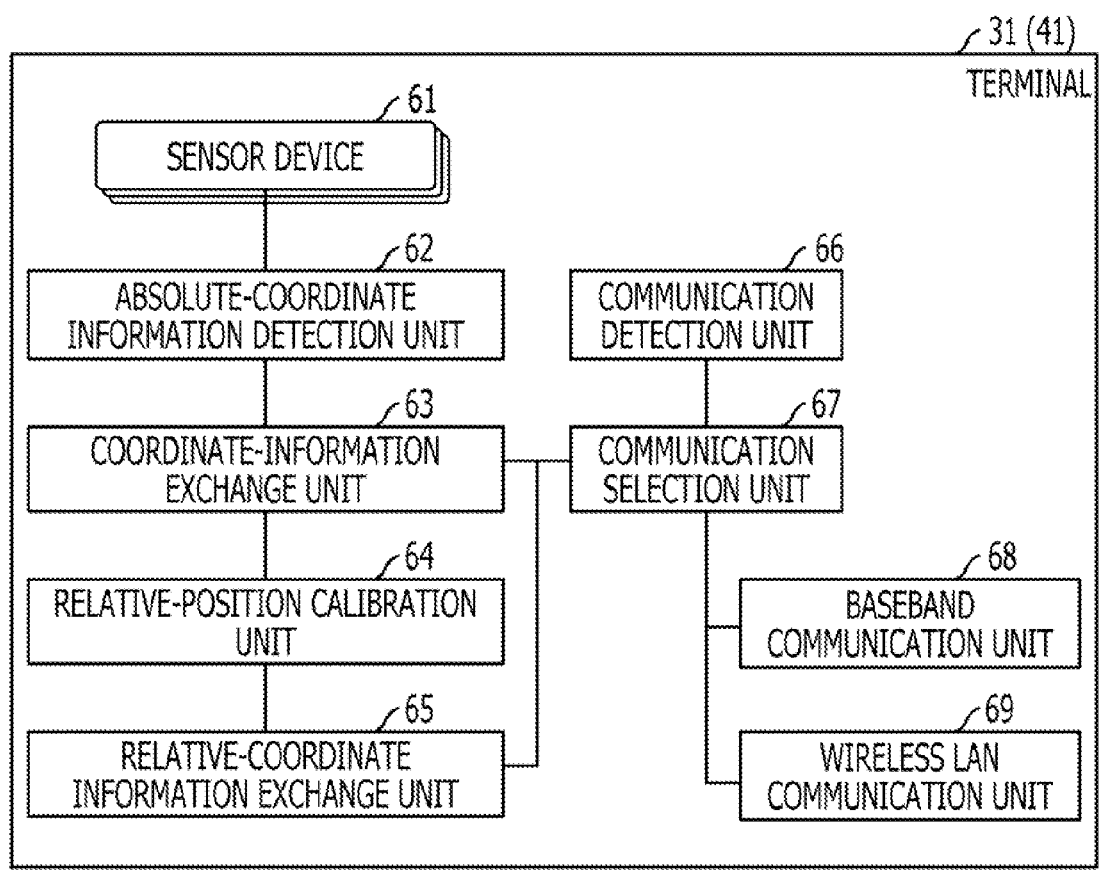
FIG. 4 is a block diagram illustrating a functional configuration of the information processing apparatus according to the second embodiment.

FIG. 4 is a block diagram illustrating a functional configuration of the information processing apparatus according to the second embodiment. As illustrated in FIG. 4, the terminals 31 and 41 include, for example, a sensor device 61 and an absolute-coordinate-information detection unit 62 as an absolute-position information acquisition unit, for example, a coordinate-information exchange unit 63 as an absolute-position-information exchange unit, and for example, a relative-position calibration unit 64 as a relative-position information acquisition unit. The terminals 31 and 41 include, for example, a relative coordinate-information exchange unit 65 as a relative-position-information exchange unit, and include, for example, a communication detection unit 66, a communication selection unit 67, a baseband communication unit 68, and a wireless LAN (Local Area Network) communication unit 69 as a communication unit.

The baseband communication unit 68 performs communication with the communication carrier network. The baseband communication unit 68 is achieved by the above-described baseband unit. The wireless LAN communication unit 69 performs communication in accordance with a wireless LAN standard, such as WiFi, etc. The wireless LAN communication unit 69 is achieved by the above-described network I/F. The communication detection unit 66 detects communication by the baseband communication unit 68 or the wireless LAN communication unit 69, checks communication quality individually by a simple packet exchange, etc., and monitors a connection having a best communication state. The communication selection unit 67 selects either one having a better communication quality from the baseband communication unit 68 and the wireless LAN communication unit 69 on the basis of the communication quality detected by the communication detection unit 66.

As an example of the sensor device 61, for example, the above-described acceleration sensor, GPS (Global Positioning System) receiver, electronic compass, etc., are given. The absolute-coordinate-information detection unit 62 detects an absolute coordinates of a position of the itself on the basis of output information of the sensor device 61. As used herein, "the absolute-coordinate" refers to a position on the earth represented by the coordinate system. As an example of coordinate axes of absolute coordinates, a longitude and a latitude are given, for example. Also, by setting any point as an origin, absolute coordinates of a terminal may be expressed by a distance from the origin. The coordinate-information exchange unit 63 exchanges information on the absolute coordinates of the itself detected by the absolute-coordinateinformation detection unit 62 with another terminal through the communication unit selected by the communication selection unit 67.

The relative-position calibration unit 64 obtains relative position information of the itself and the other terminal on the basis of information on a position of the itself and information on a position of the other terminal obtained from exchanges by the coordinate-information exchange unit 63. The relative-coordinate-information exchange unit 65 exchanges the relative-position information obtained by the relative-position calibration unit 64 with the other terminal through the communication unit selected by the communication selection unit 67. The relative-coordinate-information exchange unit 65 controls a coupling state of the itself and the other terminal on the basis of the relative-position information to go into the first mode (loosely-coupled mode), the second mode (tightly-coupled mode) or a third mode. The first mode and the second mode are the same as those described in the first embodiment.

In the third mode, individual application programs that are being executed on the itself and the other terminal, respectively, are not allowed to access either a storage or a memory of the other terminal. That is to say, in the third mode, the itself and the other terminal are not allowed to use a storage and a memory of the other terminal as shared resources with each other. In the third mode, application programs that are being executed on the itself and the other terminal, respectively are allowed to transfer files between the terminals using a protocol, such as FTP (File Transfer Protocol), etc., for example.

In the third mode, the terminals are synchronized with each other each time the application programs are started or terminated. Each terminal closes once within the itself, and performs file access processing. At the time when file access processing terminates, synchronization processing with the other terminal is performed. The third mode is called a distributed mode, and the case where terminals are coupled in a distributed mode is called a distributed system.

Description of Tightly Coupled System

Figure 5:
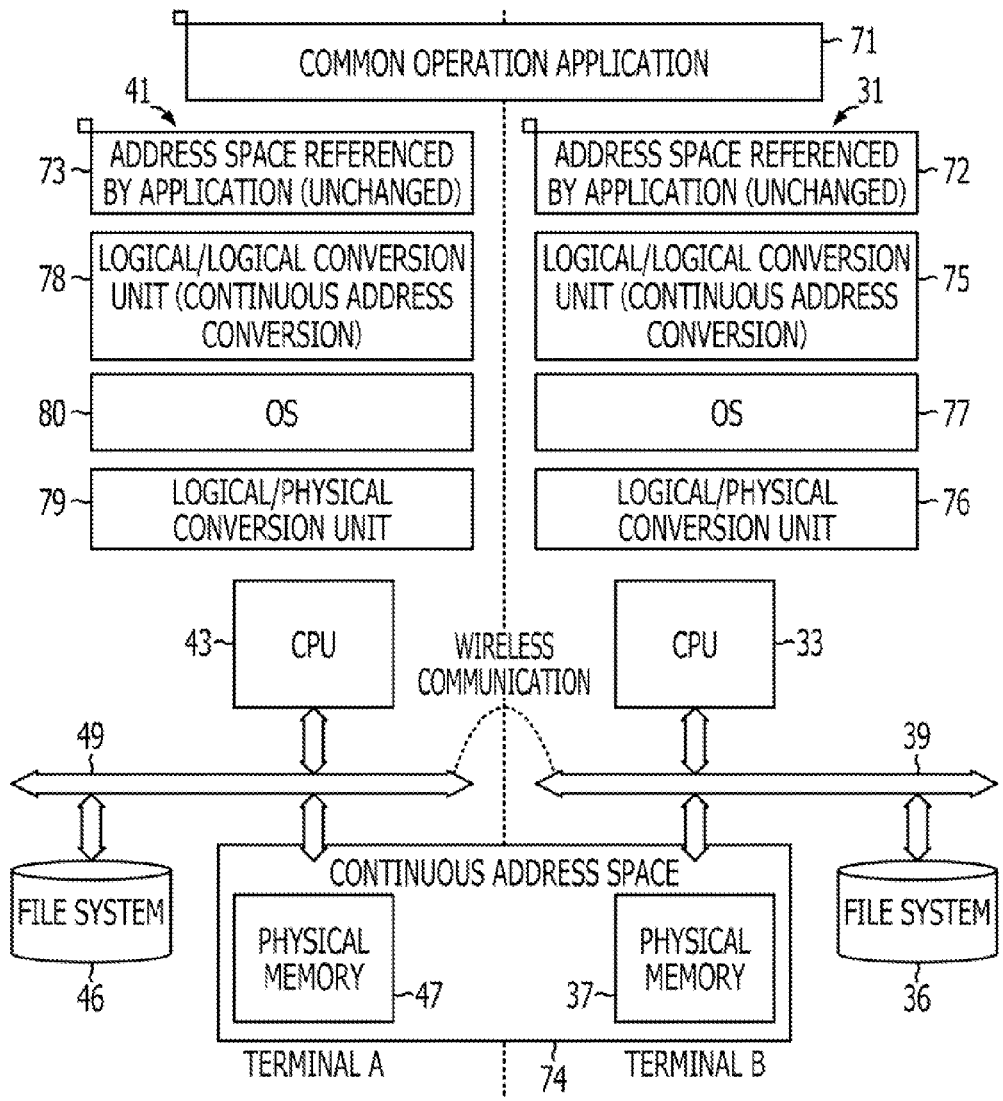
FIG. 5 is an explanatory diagram of a tightly coupled system of the information processing system according to the second embodiment.

FIG. 5 is an explanatory diagram of a tightly coupled system of the information processing system according to the second embodiment. As illustrated in FIG. 5, in a tightly coupled system, an application program (common operation application) 71 capable of performing parallel processing across the terminal B31 and the terminal A41 runs on the individual terminals 31 and 41. Logical address spaces 72 and 73 referenced by the application program 71 correspond to an address space 74, which is a continuous space of an address space related to a physical memory 37 of the terminal B31 and an address space related to a physical memory 47 of the terminal A41.

The terminal B31 has a logical/logical conversion unit 75 and a logical/physical conversion unit 76 as address conversion units in the memory management unit. The logical/logical conversion unit 75 converts the logical address space 72 referenced by the application program 71 into a logical address space managed by the OS 77 of the terminal B31. The software running on the OS 77 of the terminal B31 refers to the logical address space managed by the OS 77. The logical/physical conversion unit 76 converts a logical address space managed by the OS 77 of the terminal B31 into a physical address space in the physical memory 37 of the terminal B31. Hardware of the terminal B31 refers to the physical address space in the physical memory 37 of the terminal B31.

The terminal A41 has a logical/logical conversion unit 78 and a logical/physical conversion unit 79 in the memory management unit as address conversion units. The logical/logical conversion unit 78 converts the logical address space 73 referenced by the application program 71 capable of performing parallel processing across the terminal B31 and the terminal A41 into a logical address space managed by an OS 80 of the terminal A41. Software running on the OS 80 of the terminal A41 refers to a logical address space managed by the OS 80. The logical/physical conversion unit 79 converts a logical address space managed by the OS 80 of the terminal A41 into a physical address space in the physical memory 47 of the terminal A41. Hardware of the terminal A41 refers to the physical address space in the physical memory 47 of the terminal A41.

In the tightly coupled system, as described above, by performing logical/logical conversion of the address space, the application program 71 capable of performing parallel processing across the terminal B31 and the terminal A41 runs across the terminal B31 and the terminal A41. The CPU 33 of the terminal B31 accesses the physical memory 37 of the terminal B31 through the bus 39 of the terminal B31, and accesses the physical memory 47 of the terminal A41 through wireless communication. In the same manner, the CPU 43 of the terminal A41 accesses the physical memory 47 of the terminal A41 through the bus 49 of the terminal A41, and accesses the physical memory 37 of the terminal B31 through wireless communication.

Also, the file system 36 of the terminal B31 and the file system 46 of the terminal A41 are cross-mounted, and thus the CPU 33 of the terminal B31 accesses the file system 36 of the terminal B31 through the bus 39 of the terminal B31, and accesses the file system 46 of the terminal A41 through wireless communication. In the same manner, the CPU 43 of the terminal A41 accesses the file system 46 of the terminal A41 through the bus 49 of the terminal A41, and accesses the file system 36 of the terminal B31 through wireless communication.

Description of Loosely Coupled System

Figure 6:
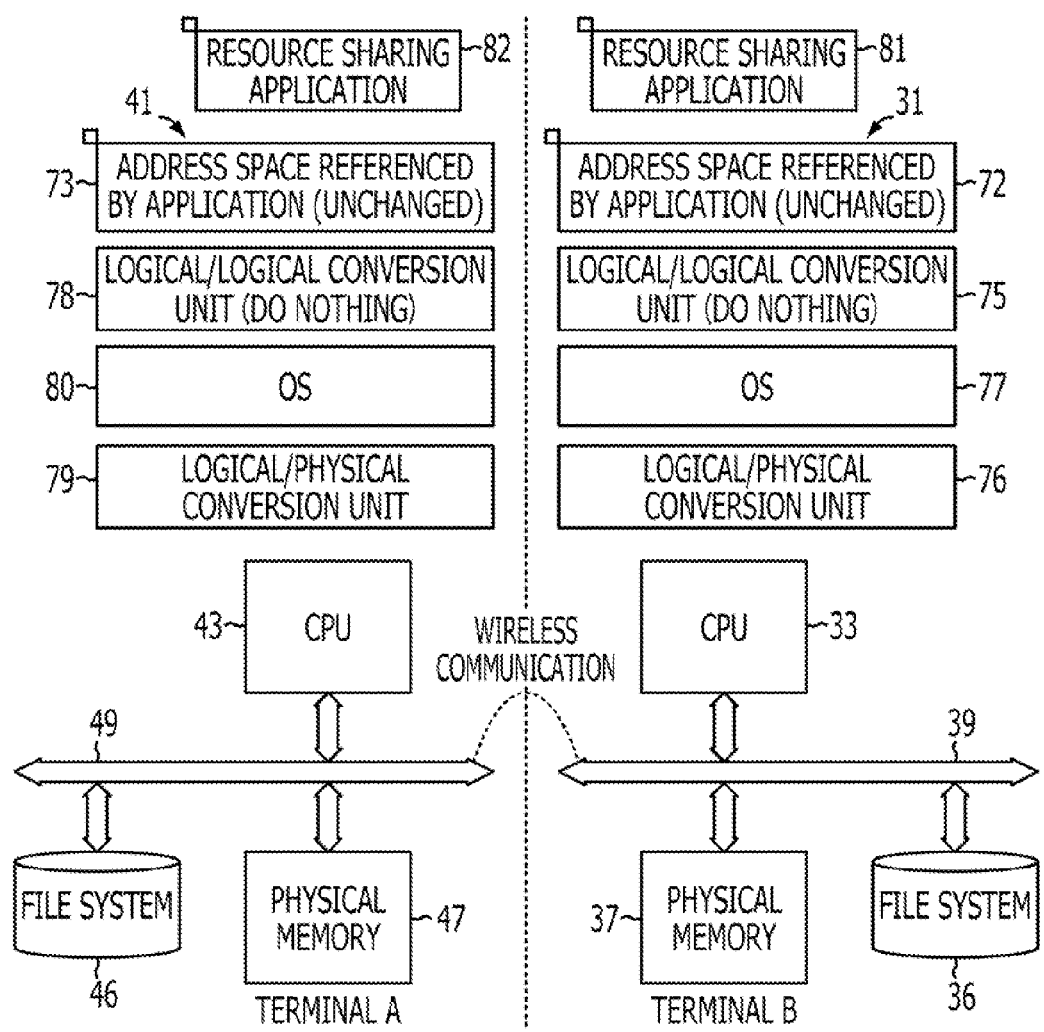
FIG. 6 is an explanatory diagram of a loosely coupled system of the information processing system according to the second embodiment.

FIG. 6 is an explanatory diagram of a loosely coupled system of the information processing system according to the second embodiment. As illustrated in FIG. 6, in a loosely coupled system, application programs that share resources of the other terminals with each other (resource sharing applications) 81 and 82 run on individual terminals 31 and 41, respectively. In the loosely coupled system, the logical address space 72 referenced by the application program 81 running on the terminal B31 is converted into a physical address space in physical memory 37 of the terminal B31 by the logical/physical conversion unit 76 of the terminal B31. The logical/logical conversion unit 75 of the terminal B31 does not perform address conversion. The logical address space 73 referenced by the application program 82 running on the terminal A41 is converted into a physical address space in the physical memory 47 of the terminal A41 by the logical/physical conversion unit 79 of the terminal A41. The logical/logical conversion unit 78 of the terminal A41 does not perform address conversion.

In the loosely coupled system, the CPU 33 of the terminal B31 accesses the physical memory 37 of the terminal B31 through the bus 39 of the terminal B31. In the same manner, the CPU 43 of the terminal A41 accesses the physical memory 47 of the terminal A41 through the bus 49 of the terminal A41. Also, the file system 36 of the terminal B31 and the file system 46 of the terminal A41 are cross-mounted, and thus accesses to the file systems 36 and 46 of the terminal B31 and the terminal A41, respectively, are the same as in the case of the above-described tightly coupled system.

Description of Distributed System

Figure 7:
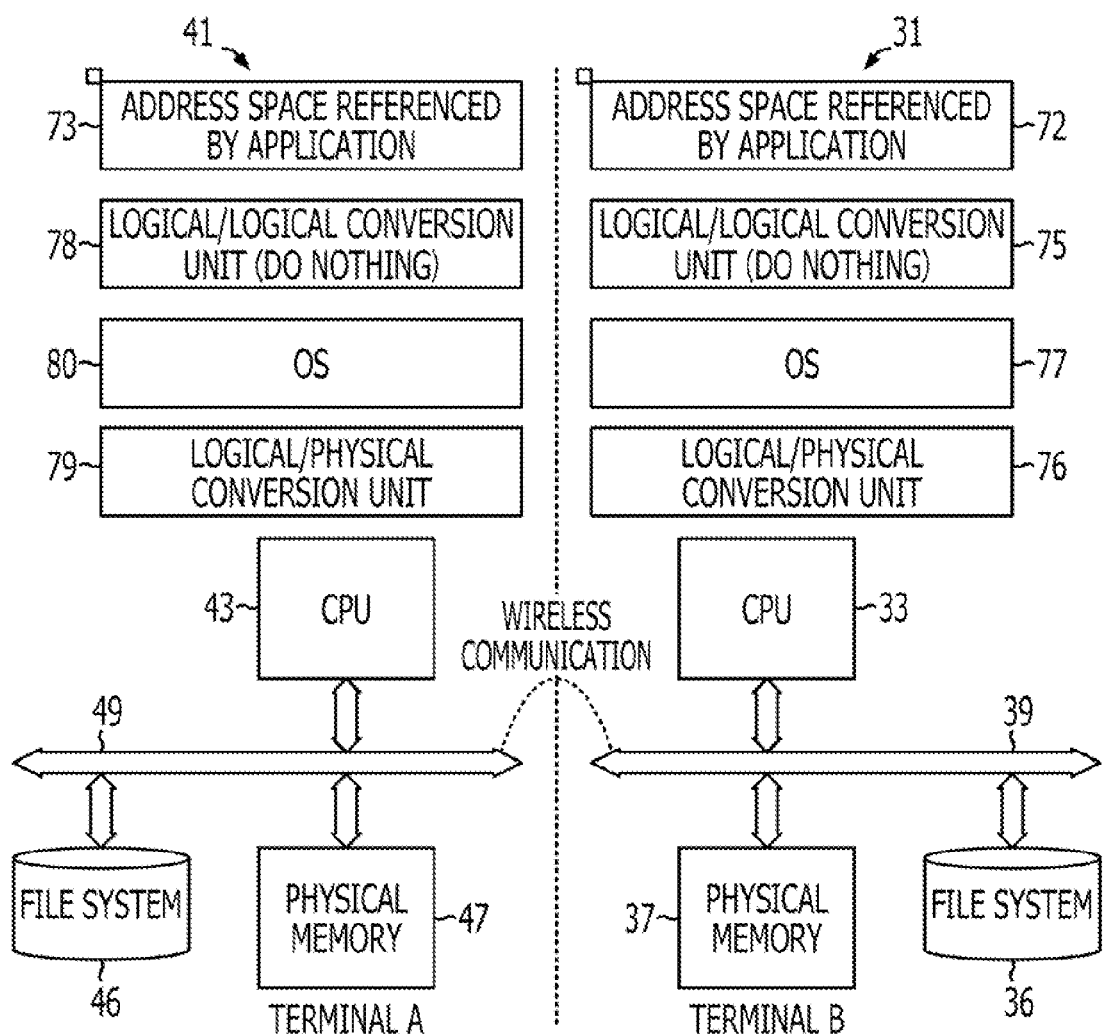
FIG. 7 is an explanatory diagram of a distributed system of the information processing system according to the second embodiment.

FIG. 7 is an explanatory diagram of a distributed system of the information processing system according to the second embodiment. As illustrated in FIG. 7, in the distributed system, the logical/logical conversion unit 75 of the terminal B31 and the logical/logical conversion unit 78 of the terminal A41 do not perform address conversion. In the distributed system, file transfer between the terminals is performed using, for example, a protocol that enables file transfer, such as FTP, etc.

Description of Operation of Information Processing System

Figure 8:
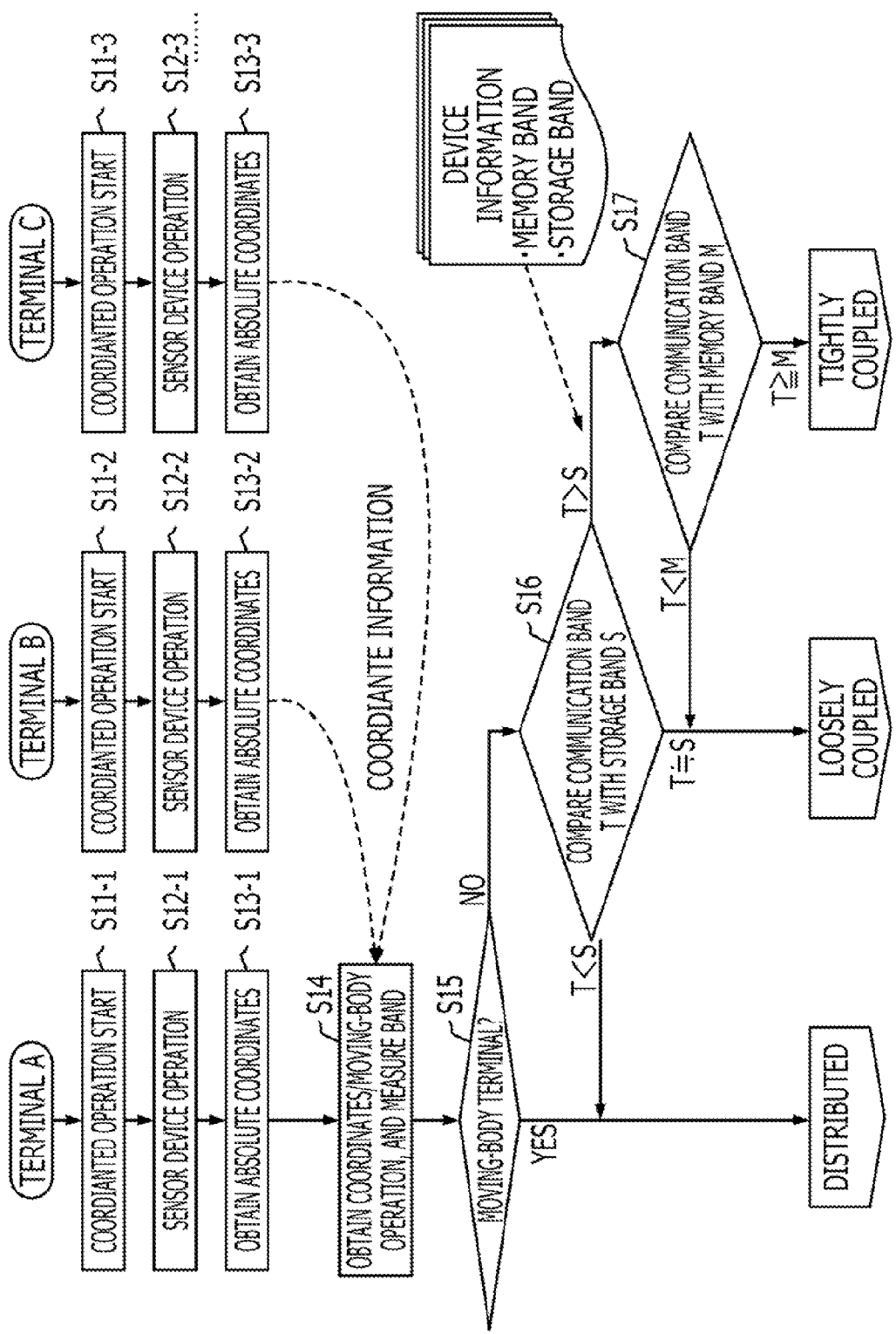
FIG. 8 is a flowchart illustrating operation of the information processing system according to the second embodiment.

FIGS. 8 to 12 are flowchart illustrating operation of the information processing system according to the second embodiment. As illustrated in FIG. 8, application programs are started on the terminal A, the terminal B, and the terminal C, and the individual terminals start coordinated operations (step S11-1, step S11-2, and step S11-3). When an application program is started on each terminal, users may check that an application program is started by exchanging emails, chatting, telephone conversation, etc., among the users operating individual terminals. For example, a terminal on which application program has been started first may be assumed to be a master. In the example illustrated in FIG. 8, the terminal A is the master.

When application programs are started, the individual terminals operate sensor devices (step S12-1, step S12-2, and step S12-3). The individual terminals obtain absolute coordinates of positions of the itself on the basis of output information of the sensor devices (step S13-1, step S13-2, and step S13-3). Next, terminals other than a master transmit absolute coordinates of the itself to the terminal A to be a master. The terminal A to be a master receives information on the absolute coordinates of terminals other than the master, and obtains relative coordinates of the terminal A to be a master and the other terminals other than the master on the basis of the information on the absolute coordinates of the individual terminals and the absolute coordinates of the terminal A to be a master.

The individual terminals may obtain absolute coordinates a plurality of times, and the terminal A to be a master may obtain relative coordinates of the itself and the terminals other than the master each time. The terminal A to be a master compares the relative coordinates of this time with the relative coordinates of the previous time so that the terminal A is allowed to grasp whether the terminals other than the master are moving or stationary with respect to the itself (coordinate•moving-body operation acquisition). Also, the terminal A to be a master transmits a signal to the terminals other than the master, and monitors time until a response to the signal is received. The terminal A to be a master obtains a distance with the terminal other than the master from the relative coordinates with the terminal other than the master, and measures a bandwidth T of wireless communication with the terminal other than the master on the basis of information on that distance and a response time to the transmission signal (step S14). In the embodiments of the specification, the bandwidth of wireless communication may used in the meaning of a communication speed.

Next, the terminal A to be a master determines whether a terminal other than the master is a moving-body terminal or not (step S15). If the terminal other than the master is a moving-body terminal (step S15: Yes), the terminal A to be a master selects a distributed system. If the terminal other than the master is not a moving-body terminal (step S15: No), the terminal A to be a master compares the bandwidth T of the wireless communication obtained in step S14 with the bandwidth S of the storage (file system) (step S16). In the embodiments of the specification, the bandwidth of storage may used in the meaning of an access speed to the storage (file system).

As an example, the bandwidth T of the wireless communication is given as follows. If the communication carrier network is LTE (Long Term Evolution) called 3.9G, for example, the bandwidth T of the wireless communication is up to a maximum of about 50 Mbps in an upward direction from the terminal to the base station, for example, and is up to a maximum of about 100 Mbps in a downward direction from the base station to the terminal, for example.

Also, if the communication carrier network is, for example, 4G (the fourth generation), the bandwidth T of the wireless communication is said to be up to a maximum of about 500 Mbps in an upward direction, for example, and is said to be up to a maximum of about 1 Gbps in the downward direction, for example. In the case of wireless communication that goes through a base station, a relative distance between the terminals has no limitation.

In the case of ad-hoc connection, the bandwidth T of wireless communication is, for example, up a maximum of about 50 Mbps by an IEEE 802.11b standard, and is, for example, up a maximum of about 300 Mbps by an IEEE 802.11n standard. In the ad-hoc connection, a relative distance of the terminals with each other is, for example, about 50 to 100 meters in an unobstructed view, and about a few meters indoors, for example.

As an example, the bandwidth S of the storage is as follows. In the case where the storage is a flash memory, for example, a bandwidth S at the time of writing data into the flash memory is about 30 Mbps, for example, and a bandwidth S at the time of reading data from the flash memory is about 100 Mbps, for example.

When the bandwidth T of the wireless communication and the bandwidth S of the storage are substantially the same (step S16: T≅S), the terminal A to be a master selects a loosely coupled system. When the bandwidth T of the wireless communication is wider than the bandwidth S of the storage (step S16: T>S), the terminal A to be a master compares the bandwidth T of the wireless communication obtained by step S14 with the bandwidth M of the memory (step S17). In the embodiments of the specification, the bandwidth of storage may used in the meaning of an access speed to the memory.

As an example, the bandwidth M of the memory is as follows. In the case of software access, the bandwidth M of the memory is, for example, about 500 Mbps in the case of writing and reading data. In the case of hardware access, the bandwidth M of the memory is, for example, about 2 Gbps in the case of writing and reading data.

If the bandwidth T of the wireless communication is not less than the bandwidth M of the memory (step S17: T≥M), the terminal A to be a master selects a tightly coupled system. If the bandwidth T of the wireless communication is less than the bandwidth M of the memory (step S17: T<M), the terminal A to be a master selects a loosely coupled system. The terminal A to be a master obtains, for example, the bandwidth S of the storage and the bandwidth M of the memory from design information on the terminal as a device information.

Figure 9:
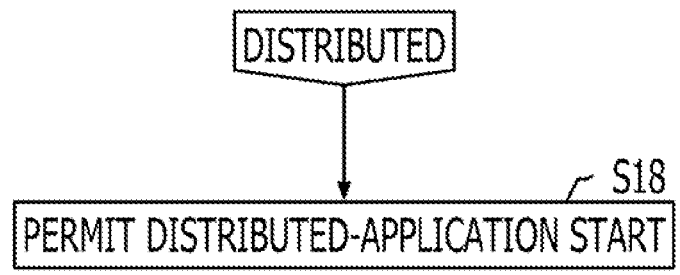
FIG. 9 is a flowchart illustrating operation of the information processing system according to the second embodiment.
Figure 10:
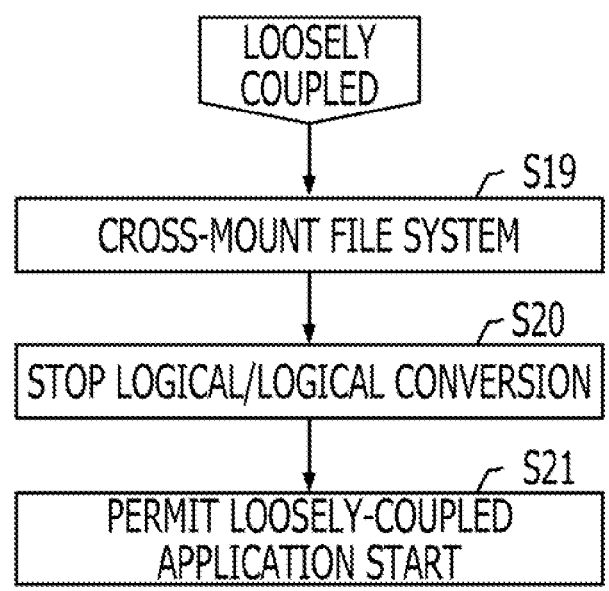
FIG. 10 is a flowchart illustrating operation of the information processing system according to the second embodiment.
Figure 11:
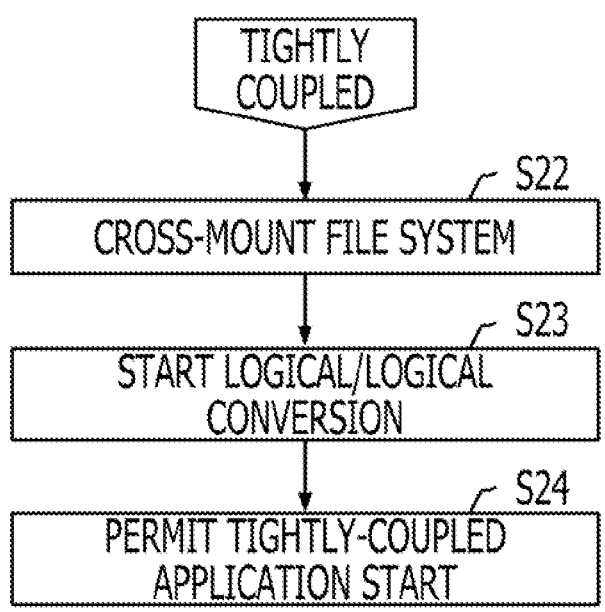
FIG. 11 is a flowchart illustrating operation of the information processing system according to the second embodiment.

If the terminal A to be a master has selected a distributed system (step S15: Yes), as illustrated in FIG. 9, each terminal permits a distributed application (an application program individually executed on each terminal) to start (step S18). If the terminal A to be a master has selected a loosely coupled system (step S16: T≅S), as illustrated in FIG. 10, each terminal cross-mounts a file system (step S19), stops the logical/logical conversion unit (step S20), and permits loosely-coupled applications (application programs sharing resources of the other terminals) to start (step S21). If the terminal A to be a master has selected a tightly coupled system (step S17: T≥M), as illustrated in FIG. 11, each terminal cross-mounts a file system (step S22), starts the logical/logical conversion unit (step S23), and permits the tightly-coupled applications (application programs capable of being processed in parallel) to start (step S24).

Description of Operation for Obtaining Relative-Position Information

Figure 12:
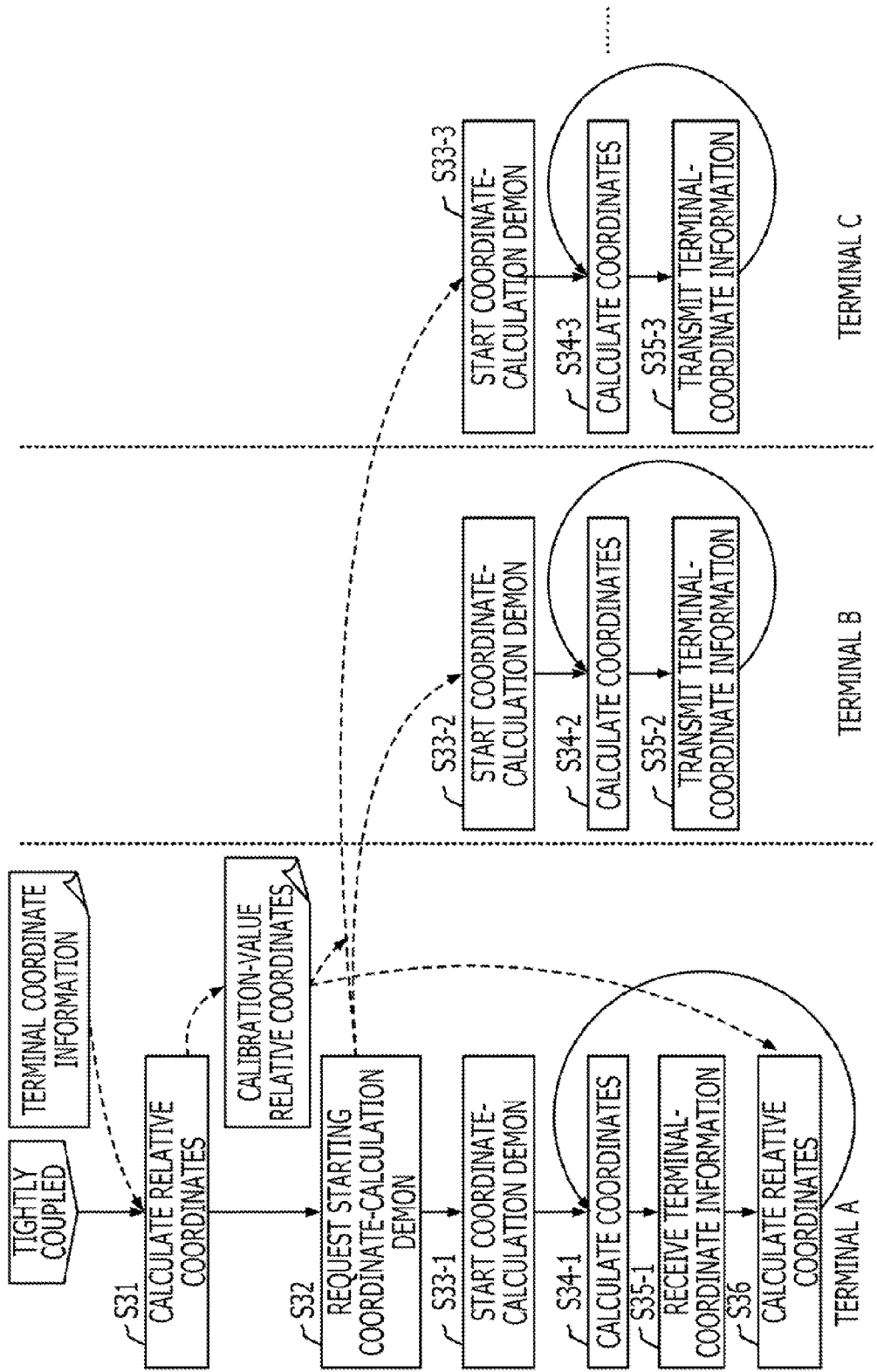
FIG. 12 is a flowchart illustrating operation of obtaining relative-position information in the information processing system according to the second embodiment.

FIG. 12 is a flowchart illustrating operation of obtaining relative-position information in the information processing system according to the second embodiment. In the example illustrated in FIG. 12, the terminal A is the master. As illustrated in FIG. 12, in the tightly-coupled mode, the terminal A to be a master calculates to obtain relative coordinates of the terminal A to be a master and a terminal other than the master on the basis of information on the absolute coordinates of each terminal (step S31). The terminal A to be a master holds the relative coordinates obtained in step S31 as calibration-value relative coordinates (correction value), and corrects the relative coordinates to be obtained thereafter using the calibration-value relative coordinates.

Next, the terminal A to be a master requests each terminal to start a coordinate calculation demon (step S32). By the start request of the coordinate calculation demon, a coordinate calculation demon is started to be a receiver side on the terminal A to be a master (step S33-1). By the start request of the coordinate calculation demon, the coordinate calculation demon is started as a center side on a terminal other than the master (step S33-2 and step S33-3). After this, the coordinate calculation demon is periodically started on each terminal.

When the coordinate calculation demon is started on each terminal, the coordinate calculation demon of each terminal calculates coordinates of the itself (step S34-1, step S34-2, and step S34-3). Next, the coordinate calculation demon of a terminal other than the master transmits information on the calculated coordinates of the itself (step S35-2, step S35-3). The coordinate calculation demon of the terminal A to be a master receives information on the coordinates from the terminal other than the master (step S35-1). And the coordinate calculation demon of the terminal A to be a master calculates to obtain relative coordinates of the terminal A to be a master and a terminal other than the master on the basis of information on the coordinates of the itself and information on the coordinates of received from the terminals other than the master, and makes a correction using the calibration-value relative coordinates (step S36).

The terminal A to be a master repeats from step S34-1 to step S36 each time a coordinate calculation demon is started periodically, and calculates to obtain relative coordinates while making a correction using the calibration-value relative coordinates. A terminal other than the master repeats step S34-2, from step S34-3 to step S35-2, and step S35-3 each time each of the coordinate calculation demons is started periodically, and obtains information on the coordinates of the itself and transmits the information.

Description of Processing Converting Address Space

Figure 13:
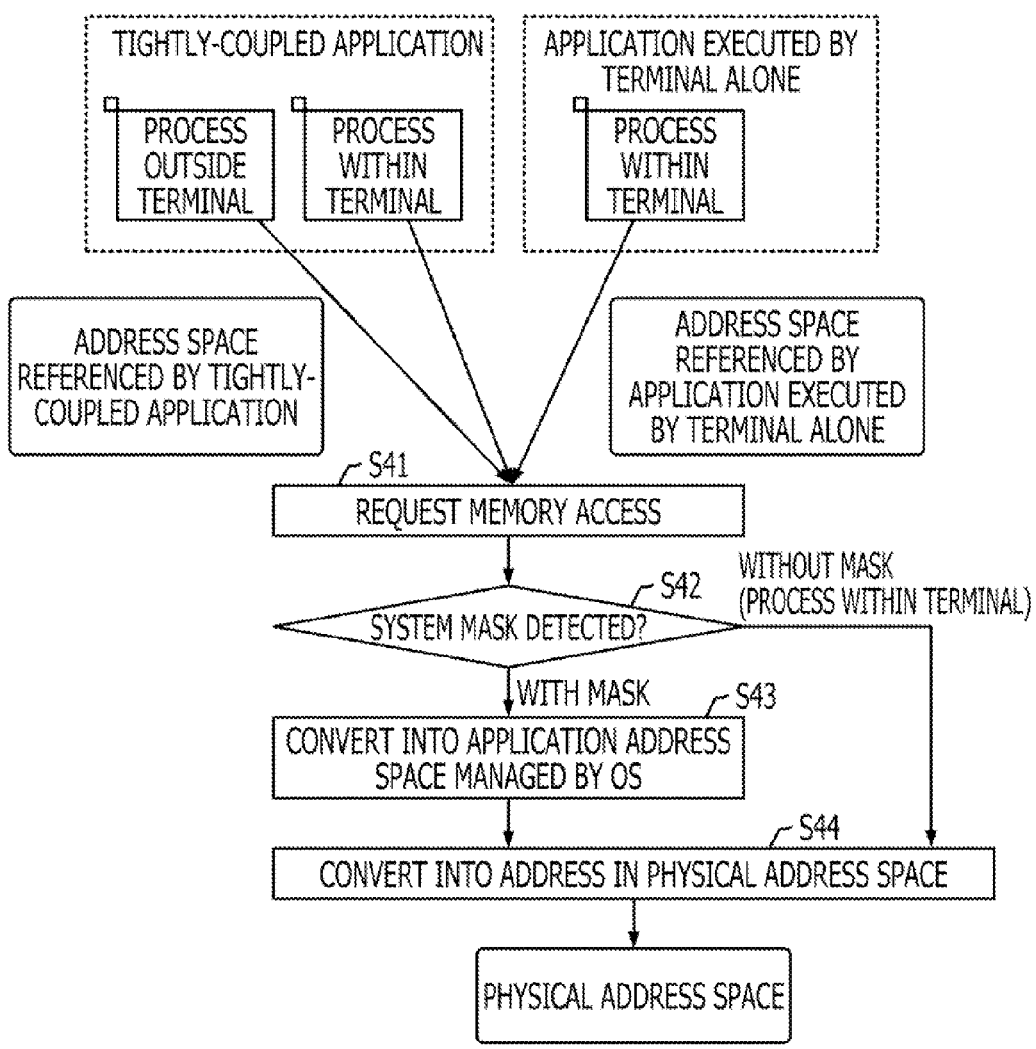
FIG. 13 is a flowchart illustrating processing for converting an address space in the information processing system according to the second embodiment.

FIG. 13 is a flowchart illustrating processing for converting an address space in the information processing system according to the second embodiment. As illustrated in FIG. 13, when terminals are coupled with each other in a tightly-coupled mode, tightly-coupled applications are executed on the terminals. While the tightly-coupled application is being executed, a memory access request occurs in a process running on the itself (process within terminal) or a process running on the other terminal (process outside terminal) (step S41). As an example, it is assumed that a logical address referenced by the tightly-coupled application is "0x1110 0000 0000 1234". For example, an upper-side "1110" is a system mask of a tightly-coupled application. Also, when a terminal is executing an application alone (application executed by terminal alone), a memory access request occurs from a process executed by the itself (process within terminal) (step S41).

When a memory access is requested, the logical/logical conversion unit of the terminal detects a system mask of the logical address (step S42). In the case of a process within terminal or a process outside terminal of the tightly-coupled application, a system mask of the tightly-coupled application is detected. In the case of a process within terminal of the application executed by terminal alone, a system mask is not detected.

If there is a system mask (step S42: with mask), the logical/logical conversion unit converts the logical address referenced by the tightly-coupled application into an address of the logical address space managed by the OS running on the itself (step S43). As an example, it is assumed that a system mask of the OS is "0x0000 ffff ffff ffff". If a logical product (AND) between the logical address referenced by the above-described tightly-coupled application and the system mask of the OS is produced, the logical address referenced by the tightly-coupled application is converted into "0x0000 0000 0000 1234" in the logical address space managed by the OS.

Next, the logical/physical conversion unit of the terminal converts the logical address after the logical/logical conversion into an address of a physical address space referenced by hardware of the itself (step S44). As an example, it is assumed that an offset of the hardware is "0x00ff 0000 0000 0000". When a logical add (OR) is produced between the logical address after the above-described logical/logical conversion and the offset of the hardware, the logical address after the logical/logical conversion is converted into "0x00ff 0000 0000 1234" in the physical address space referenced by the hardware of the itself.

On the other hand, if there is no system mask in step S42 (step S42: without mask), the logical/logical conversion unit does nothing. And the logical/physical conversion unit of the terminal converts the logical address of the process within the terminal of the application executed by a terminal alone into an address in the physical address space referenced by the hardware of the itself (step S44).

Third Embodiment

Figure 14:
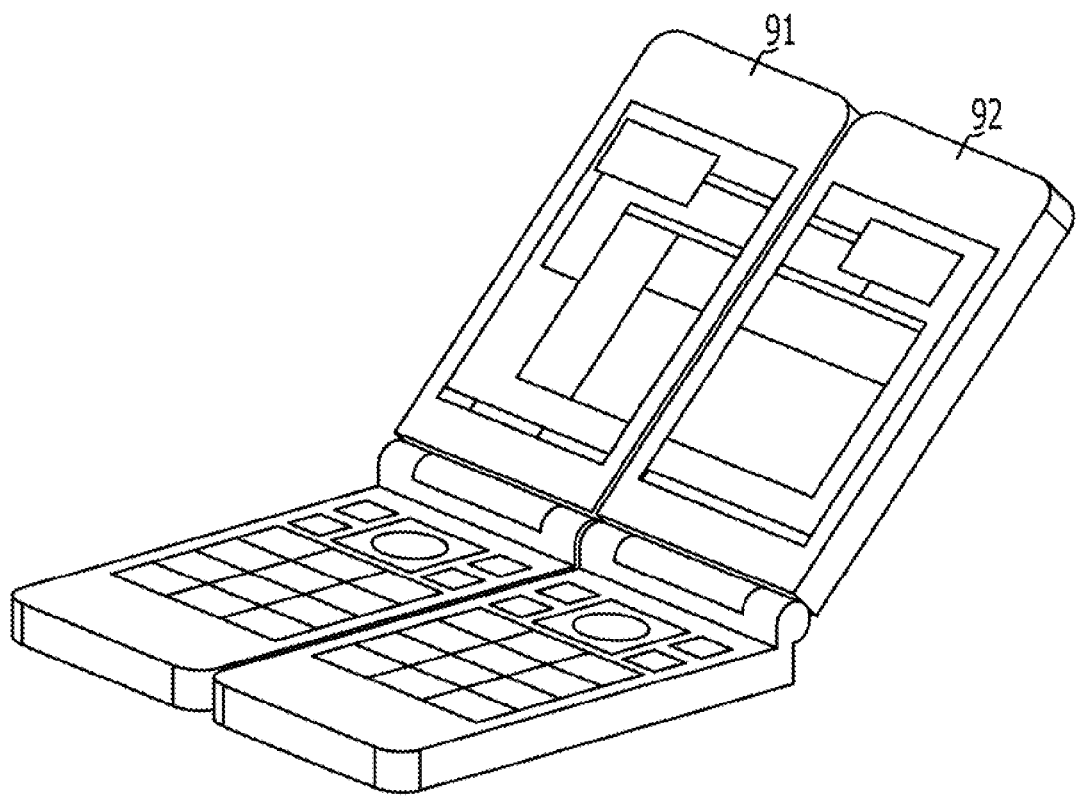
FIG. 14 is an explanatory diagram of a third embodiment of the information processing system.

FIG. 14 is an explanatory diagram of a third embodiment of the information processing system. As illustrated in FIG. 14, the third embodiment is an example in which a plurality of terminals use display screens of the terminals as a shared resource in a tightly coupled system. In the third embodiment, it is possible to unite user operation of the terminal 91 with user operation of the terminal 92. For example, one GUI (Graphical User Interface) screen may be displayed on a display screen of the terminal 91 and a display screen of the terminal 92. For example, the users of the terminals 91 and 92 are allowed to move an icon data displayed on the GUI screens between the terminal 91 and the terminal 92 by operating the terminals 91 and 92 while viewing the GUI screens. Also, as a virtual terminal Windows application, etc., it is possible to display a screen displayed on a display screen of the other terminal on a display screen of the itself, and the user of the itself is allowed to operate the other terminal while viewing a display screen of the itself.

Fourth Embodiment

Figure 15:
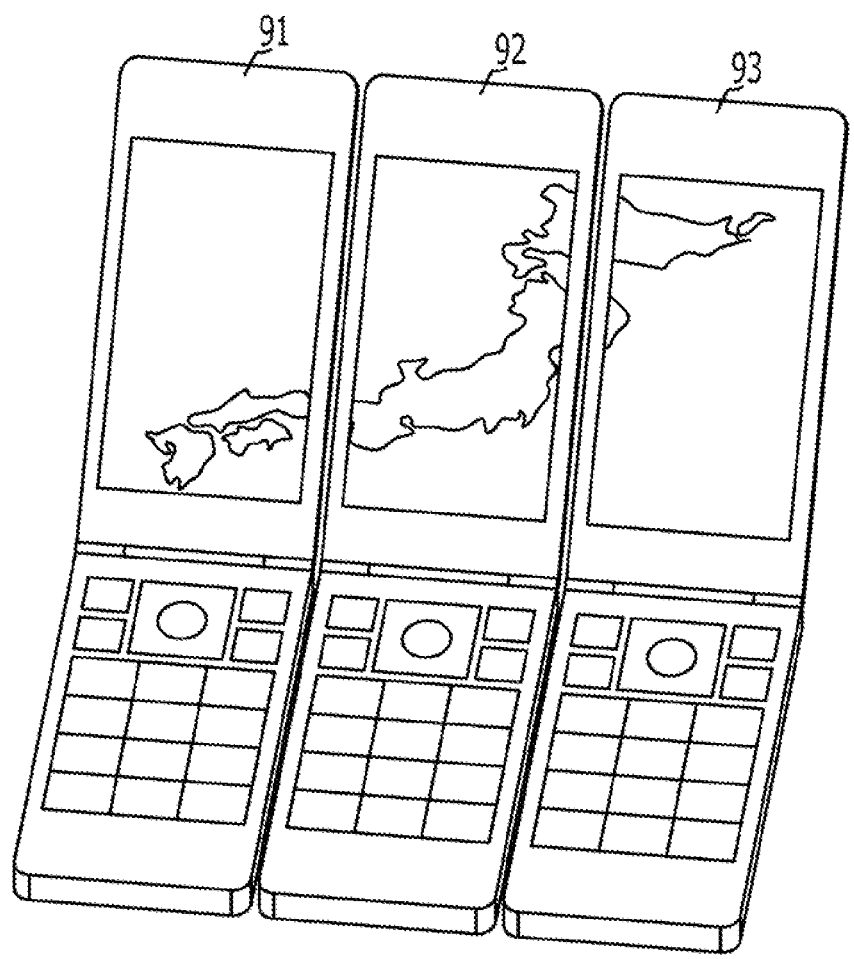
FIG. 15 is an explanatory diagram of a fourth embodiment of the information processing system.

FIG. 15 is an explanatory diagram of a fourth embodiment of the information processing system. As illustrated in FIG. 15, the fourth embodiment is an example in which a plurality of terminals use display screens of the terminals as shared resources in a tightly coupled system. In the fourth embodiment, it is possible for the display screen of the terminal 91, the display screen of the terminal 92, and the display screen of the terminal 93 to constitute one large display screen, and to display details on that large screen. For example, it is possible to detect a relative position and a direction of each terminal using an acceleration sensor, a magnetic sensor, a touch sensor, etc., to divide an original image by the number of terminals, and to enlarge and display the individual divided images on display screens of the individual terminals in order to display a detailed image.

Figure 16:
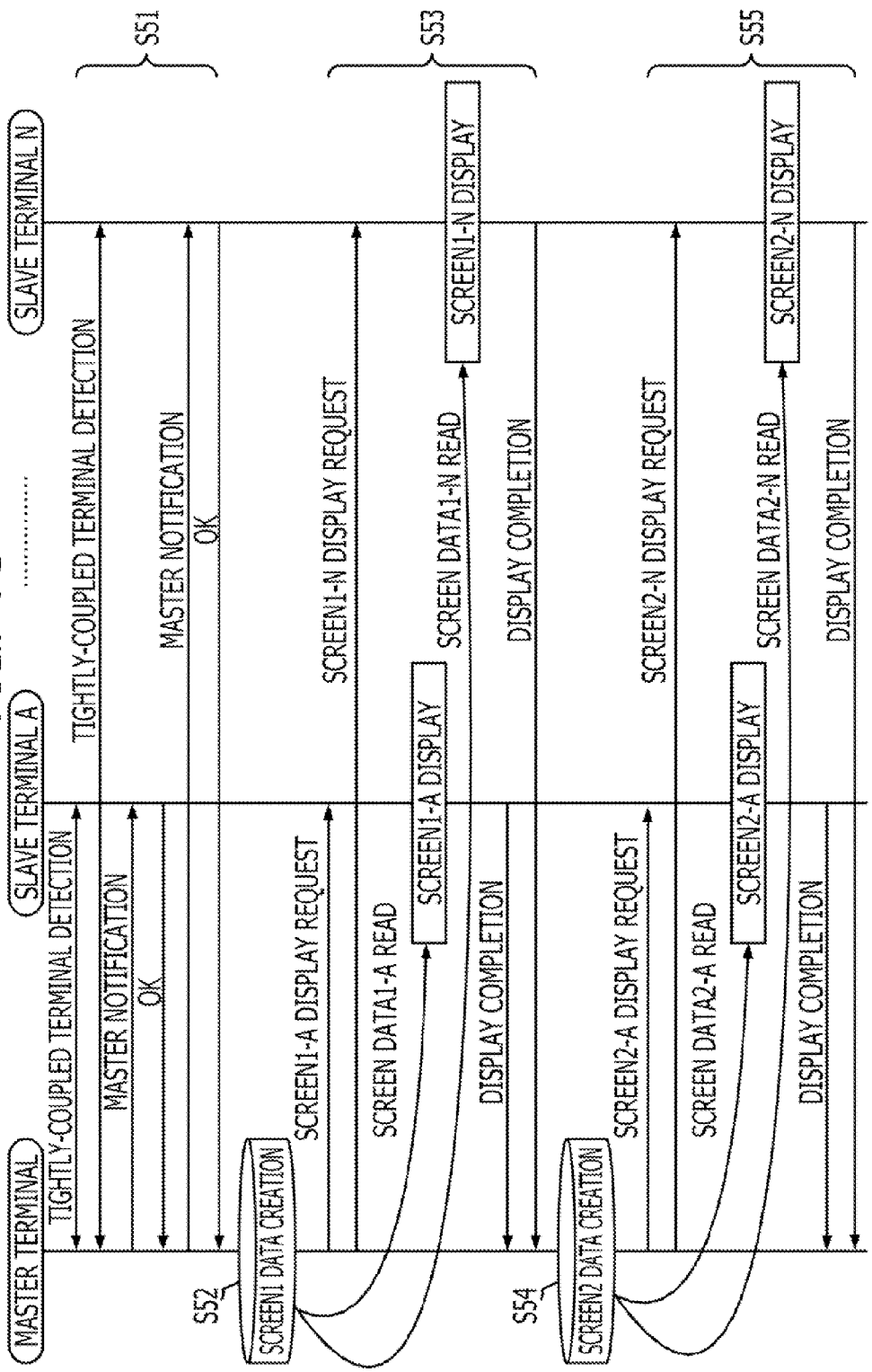
FIG. 16 is a sequence chart illustrating operation of the fourth embodiment.

FIG. 16 is a sequence chart illustrating operation of the fourth embodiment. As illustrated in FIG. 16, a terminal to be a master detects terminals that are coupled in a tightly-coupled mode. The terminal to be a master notifies each of the detected terminals (terminals to be a slave) that the itself is a master. Each of the terminals to be a slave replies to the notification from the terminal to be a master with consent (step S51).

The terminal to be a master generates image data of screen 1 (step S52). Next, the terminal to be a master requests each terminal to be a slave to display a divided image of the screen 1. Each terminal to be a slave reads divided image data of the screen 1 that is to be displayed on the itself, for example, from a storage (file system) of the terminal to be a master, displays the image on the display screen of the itself, and notifies display completion to the terminal to be a master (step S53). When the terminal to be a master receives display notifications from all the terminals to be a slave, the terminal to be a master generates image data of a screen 2 (step S54). And in the same manner as step S53, each terminal to be a slave displays the divided image data of the screen 2 onto the display screen of the itself (step S55). In this manner, the divided image of the original image is displayed on the display screen of each terminal in sequence. The same thing applies to the above-described third embodiment as well.

Fifth Embodiment

Figure 17:
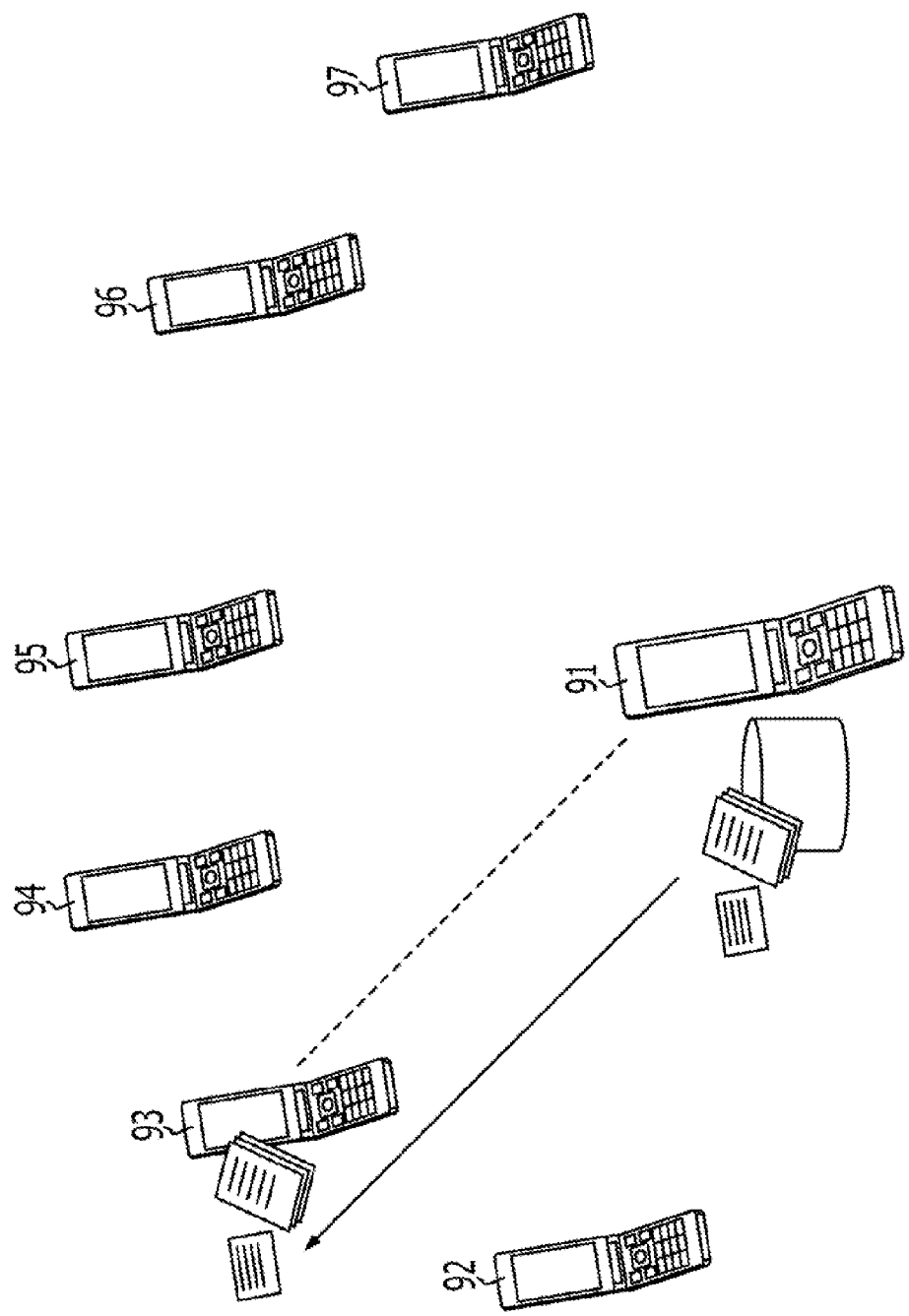
FIG. 17 is an explanatory diagram of a fifth embodiment of the information processing system.

FIG. 17 is an explanatory diagram of a fifth embodiment of the information processing system. As illustrated in FIG. 17, the fifth embodiment is an example in which a file and an application are shared with a terminal selected from a plurality of terminals in a tightly coupled system. In the fifth embodiment, a terminal 91 is allowed to select a terminal 93 to be a target among a plurality of terminals 92 to 97 on the basis of distances and relative position relationships with the other terminals 92 to 97, and to share files and applications with the selected terminal 93. For example, in the case where there are a plurality of terminals in a lecture hall, a conference room, etc., by a user of the terminal 91 directs the terminal 91 toward the terminal 93 to be a target, and thus the terminal 91 is allowed to exchange email addresses with the terminal 93 to be a target, or to exchange image data.

Figure 18:
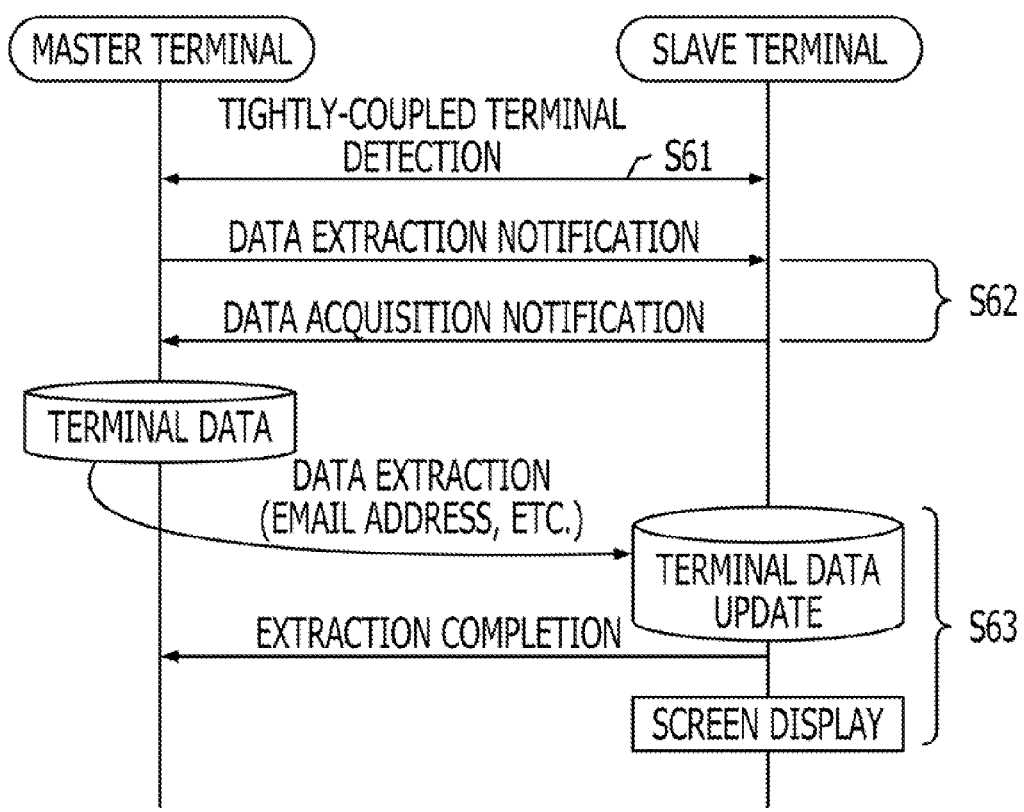
FIG. 18 is a sequence chart illustrating operation of the fifth embodiment.

FIG. 18 is a sequence chart illustrating operation of the fifth embodiment. As illustrated in FIG. 18, the terminal to be a master (the terminal 91 in the example in FIG. 17) detects a terminal coupled in a tightly-coupled mode (step S61). The terminal to be a master notifies permission to extract data to the detected terminal to be a target (terminal to be a slave, the terminal 93 in the example in FIG. 17). The terminal to be a target notifies data extraction to the terminal to be a master (step S62).

Next, the terminal to be a target extracts data, such as email addresses, etc., from the storage of the terminal to be a master, and stores the data into the storage of the itself to update the data of the itself. The terminal to be a target notifies the terminal to be a master that data extraction has been completed. The terminal to be a target displays that data extraction has been completed on the display screen of the itself. Alternatively, the terminal to be a target may display the extracted data on the display screen of the itself (step S63).

Sixth Embodiment

Figure 19:
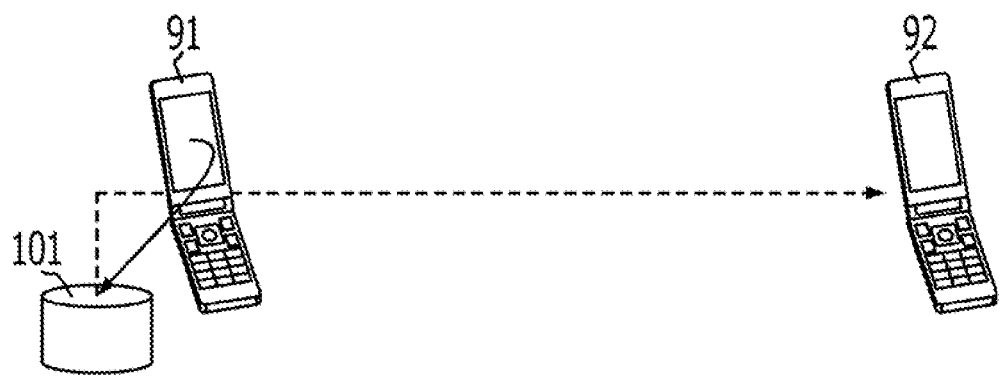
FIG. 19 is an explanatory diagram of a sixth embodiment of the information processing system.

As illustrated in FIG. 19, a sixth embodiment is an example of a loosely coupled system. In the sixth embodiment, in the case where a user of a terminal 91 and a user of a terminal 92 are apart in a distance allowing the users to directly talk with each other, for example, a few meters apart, data stored in the storage or the memory of one terminal 91 may be shared by the other terminal 92. In the sixth embodiment, operation such as moving icon data between the terminals as described in the third embodiment ought not to be allowed. For example, the user of the terminal 92 is allowed to view image data, such as a photograph, etc., stored in the storage 101 of the terminal 91 without transferring the data to the terminal 92.

Seventh Embodiment

Figure 20:
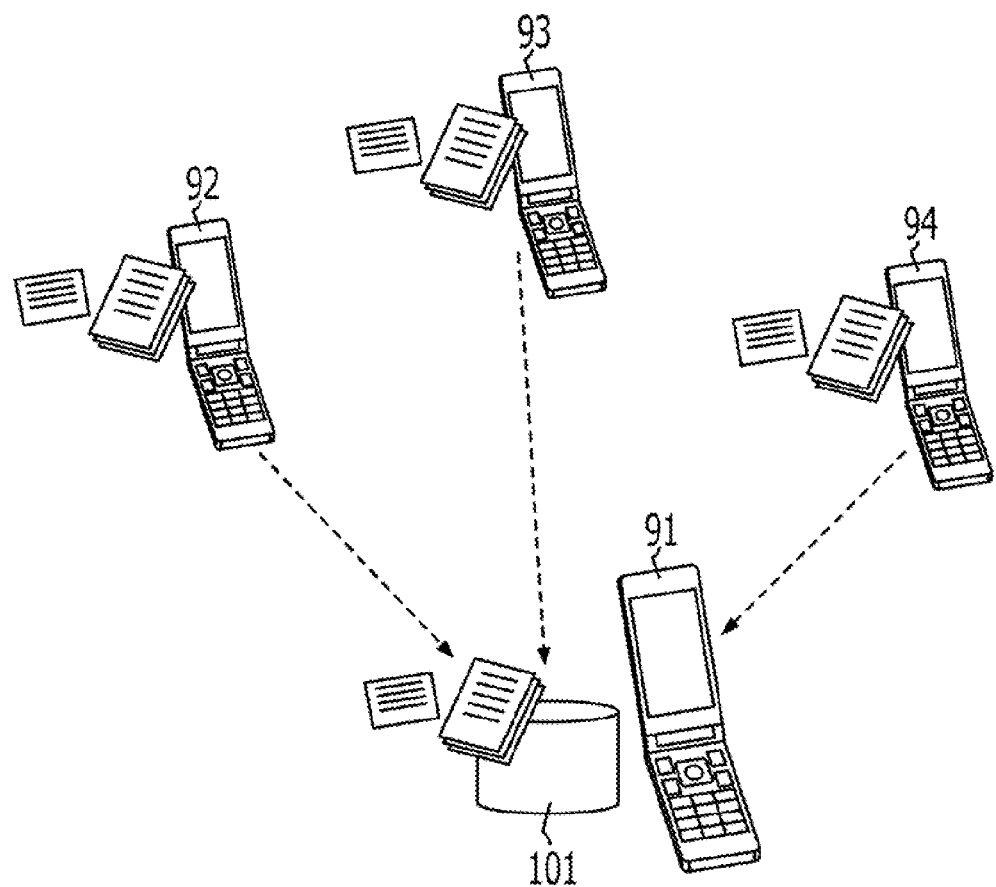
FIG. 20 is an explanatory diagram of a seventh embodiment of the information processing system.
Figure 21:
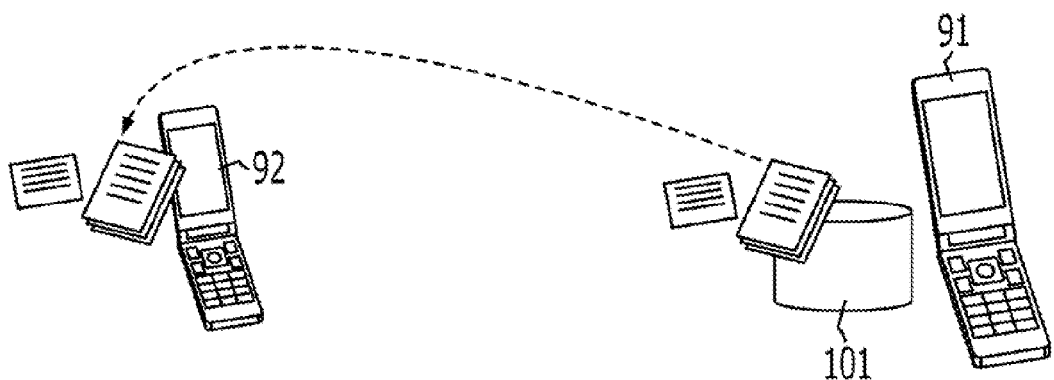
FIG. 21 is an explanatory diagram of an eighth embodiment of the information processing system.

As illustrated in FIG. 20, a seventh embodiment is an example of a loosely coupled system. In the seventh embodiment, for example, a plurality of terminals located in a room is allowed to share files. In the seventh embodiment, the terminals 92, 93, and 94 are allowed to share a file in the storage 101 of the terminal 91 without transferring the file to the itself.

Eighth Embodiment

As illustrated in FIG. 20, a eighth embodiment is an example of a distributed system. In the eighth embodiment, a file in the storage 101 of the terminal 91 may be transferred to, for example, the terminal 92 located at a remote place from the terminal 91. The eighth embodiment may be applied to the case where, for example, a video game application of a fighting-via-communication type is performed among a plurality of terminals, etc.

By the second embodiment, terminals are coupled with each other in a tightly-coupled mode or a loosely-coupled mode on the basis of a distance between the terminals, a relative position relationship, a bandwidth of communication between the terminals, and a bandwidth of a storage and a memory, etc., and thus the terminals may share resources, such as a storage, a memory, etc., with each other. Also, the terminals may access a storage or a memory of the other terminal with each other, and thus the terminals may transfer data with each other using only a communication network without going through a server.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. An information processing system comprising:
a first information processing apparatus including a first processor configured to transmit information on the position of the first information processing apparatus; and
a second information processing apparatus including a second processor configured to
acquire a position of the second information processing apparatus;
receive the information on the position of the first information processing apparatus;
acquire relative position information of the second information processing apparatus and the first information processing apparatus on the basis of the information on the position of the second information processing apparatus and the first information processing apparatus; and
select a coupling mode of the second information processing apparatus and the first information processing apparatus to be a first mode or a second mode based on the relative position information and a data transfer rate between the first information processing apparatus and the second information processing apparatus,
wherein the first mode allows application programs being executed on the first information processing apparatus to access a storage of the second apparatus and allows application programs being executed on the second information processing apparatus to access a storage of the first apparatus, and
wherein the second mode allows application programs being executed on the first information processing apparatus to access a storage and a memory of the second apparatus and allows application programs being executed on the second information processing apparatus to access a storage and a memory of the first apparatus.

2. The information processing system according to claim 1, wherein
the first processor acquires a position of the first information apparatus a plurality of times, and
the second processor acquires a position of the second information apparatus a plurality of times, and determines whether the first information processing apparatus relatively remains stationary or moving with respect to the second information apparatus on the basis of information on the position of the second information apparatus acquired the plurality of times and information on the position of the first information processing apparatus acquired the plurality of times.

3. The information processing system according to claim 2, wherein
the second processor determines that the first information processing apparatus remains relatively stationary with respect to the second information apparatus on the basis of the information on the relative position, and
when the data transfer rate between the second information apparatus and the first information processing apparatus is substantially same as an access speed of the storage of the first information processing apparatus, the second processor selects the first mode.

4. The information processing system according to claim 2, wherein when the second processor determines that the first information processing apparatus remains relatively stationary on the basis of the information on the relative position, and when a the data transfer rate between the second information apparatus and the first information processing apparatus is greater than an access speed of the storage of the first information processing apparatus and the data transfer rate is greater than an access speed of the memory of the first information processing apparatus, the second processor selects the second mode.

5. The information processing system according to claim 4, wherein
the first processor converts a logical address space referenced by an application program performed on the first information processing apparatus and on the second information processing apparatus in parallel into a logical address space managed by an operation system executed on the first information processing apparatus, and converts the logical address space after the conversion into a physical address space of the first information processing apparatus, and
the second processor converts a logical address space referenced by an application program performed in the first information processing apparatus and in the second information processing apparatus in parallel into a logical address space managed by an operation system executed on the second information processing apparatus, and converts the logical address space after the conversion into a physical address space of the second information processing apparatus.

6. An information processing apparatus comprising:
a processor configured to
acquire a position of the information processing apparatus;
exchange position information with a communication device;
acquire a relative position information of the information processing apparatus and the communication device on the basis of information on a position of the information processing apparatus and information on a position of the communication device;
exchange the relative position information with the communication device; and
select a coupling mode of the information processing apparatus and the communication device to be a first mode or a second mode based on the relative position information and a data transfer rate between the information processing apparatus and the communication device,
wherein the first mode allows an application program being executed on the information processing apparatus to access a storage of the communication device, and the second mode allows an application program being executed on the information processing apparatus to access a storage and a memory of the communication device.

7. The information processing apparatus according to claim 6, wherein
the processor acquires a position of the information processing apparatus a plurality of times,
processor determines whether the communication device relatively remains stationary or moving with respect to the information processing apparatus on the basis of information on the position of the information processing apparatus acquired the plurality of times and the information on the position of the communication device acquired a plurality of times.

8. The information processing apparatus according to claim 7, wherein
the processor determines that the communication device remains relatively stationary with respect to the information processing apparatus on the basis of the information on the relative position, and when the data transfer rate between the information processing apparatus and the communication device is substantially same as an access speed of the storage of the communication device, the relative-position-information exchange unit selects the first mode.

9. The information processing apparatus according to claim 7, wherein the processor determines that the communication device remains relatively stationary with respect to the information processing apparatus on the basis of the information on the relative position, and when the data transfer rate between the information processing apparatus and the communication device is greater than an access speed of the storage of the communication device and the data transfer rate is greater than an access speed of the memory of the communication device, a determination is made to couple with the communication device in the second mode.

10. The information processing apparatus according to claim 9, wherein the processor is further configured to:
convert a logical address space referenced by an application program performed on the information processing apparatus and in the communication device on parallel into a logical address space managed by an operation system executed on the information processing apparatus, and converts the logical address space after the conversion into a physical address space of the information processing apparatus.

11. A method of processing information at a first information processing apparatus, the method comprising:
acquiring an absolute-position of the first information processing apparatus;
acquiring an absolute-position of a second information processing apparatus;
acquiring relative position information of the second information processing apparatus and the first information processing apparatus on the basis of the absolute-position of the first information processing apparatus and the absolute-position of the second information processing apparatus; and
selecting a coupling mode of the second information processing apparatus and the first information processing apparatus to be a first mode or a second mode based on the relative position information and a data transfer rate between the first information processing apparatus and the second information processing apparatus,
wherein the first mode allows application programs being executed on the first and second information processing apparatuses apparatus to access a storage of the other second apparatus and allows application programs being executed on the second information processing apparatus to access a storage of the first apparatus, and
wherein the second mode allows application programs being executed on the first and second information processing apparatuses apparatus to access a storage and a memory of the other second apparatus and allows application programs being executed on the second information processing apparatus to access a storage and a memory of the first apparatus.

12. An information processing system comprising:
a first apparatus including a first processor configured to transmit information on the position of the first apparatus; and
a second apparatus including a second processor configured to
acquire a position of the second apparatus;
receive the information on the position of the first apparatus;
acquire relative-position information of the second and the first apparatuses on the basis of the information on the position of the second and the first apparatuses; and
select a coupling mode of the second and the first apparatuses to be a first mode or a second mode based on the relative position information and a data transfer rate between the first apparatus and the second apparatus,
wherein the first mode allows application programs being executed on the first and second information processing apparatuses apparatus to access a storage of the other second apparatus and allows application programs being executed on the second information processing apparatus to access a storage of the first apparatus, and
wherein the second mode allows application programs being executed on the first and second information processing apparatuses apparatus to access a storage and a memory of the other second apparatus and allows application programs being executed on the second information processing apparatus to access a storage and a memory of the first apparatus.

* * * * *